(12) United States Patent
Horn (10) Patent No.: US 11,163,766 B2
(45) Date of Patent: Nov. 2, 2021

(54) UNIQUE KEY LOOKUP WITH ADDITIONAL FILTER

(71) Applicant: SAP SE, Walldorf (DE)

(72) Inventor: Oliver Horn, Nussloch (DE)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 16/375,166

(22) Filed: Apr. 4, 2019

(65) Prior Publication Data

US 2020/0320073 A1 Oct. 8, 2020

(51) Int. Cl.
*G06F 17/00* (2019.01)
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| | | | | |
|---|---|---|---|---|
| 2009/0259644 A1* | 10/2009 | Scheuermann | ... | G06F 16/24542 |
| 2011/0083037 A1* | 4/2011 | Bocharov | ........... | H04L 65/4069 |
| | | | | 714/4.11 |
| 2013/0028174 A1* | 1/2013 | Cabos | .................. | H04L 51/063 |
| | | | | 370/316 |
| 2014/0379690 A1* | 12/2014 | Ahmed | ............. | G06F 16/24544 |
| | | | | 707/713 |
| 2015/0277917 A1* | 10/2015 | Chavan | ............... | H03M 7/6017 |
| | | | | 712/7 |
| 2015/0286681 A1* | 10/2015 | Baer | .................. | G06F 16/24554 |
| | | | | 707/754 |
| 2015/0363167 A1* | 12/2015 | Kaushik | .................... | G06F 7/24 |
| | | | | 707/753 |
| 2016/0306995 A1* | 10/2016 | Arasu | .................. | G06F 21/6218 |
| 2017/0109377 A1* | 4/2017 | Baer | ..................... | G06F 16/335 |
| 2017/0109389 A1* | 4/2017 | Bardoliwalla | .... | G06F 16/24539 |
| 2017/0116335 A1* | 4/2017 | Baby | .................. | H04L 67/2814 |

* cited by examiner

*Primary Examiner* — Hasanul Mobin
(74) *Attorney, Agent, or Firm* — Mintz Levin Cohn Ferris Glovsky and Popeo, P.C.

(57) ABSTRACT

A method, a system, and a computer program product for executing a query. The query requiring access to one or more tables stored in a database system is executed. The query includes one or more filter predicates. Using a unique key value corresponding to a first predicate, at most one row in the tables including a portion of data matching the unique key value is identified. Using filter values corresponding to the filter predicates, another portion of data in the identified row is compared to the filter values to determine whether that portion of data matches the filter values. Based on the comparison, a result of the execution of the query is outputted. The result includes data stored in the identified row upon determination that the data matches the unique key value corresponding to the first filter predicate and the filter values corresponding to remaining filter predicates. Otherwise, the result is empty.

14 Claims, 7 Drawing Sheets

| Row ID | ID | Name | City |
|--------|----|------|------|
| 1 | 1 | Fred | Walldorf |
| 2 | 1 | Max | Walldorf |
| 3 | 42 | Oliver | Walldorf |

UNIQUE KEY LOOKUP WITH ADDITIONAL FILTER

TECHNICAL FIELD

This disclosure relates generally to data processing and, in particular, to query execution planning, as well as unique key lookup with additional filters.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance, including addressing responses to queries implementing unique key lookup with additional filtering.

SUMMARY

In some implementations, the current subject matter relates to a computer implemented method for executing a query. The method may include executing a query, the query requiring access to one or more tables stored in a database system, the query including one or more filter predicates; identifying, using a unique key value corresponding to a first filter predicate in the one or more filter predicates, at most one row in the tables including a portion of data matching the unique key value; comparing, using filter values corresponding to the filter predicates, at least another portion of data in the identified row to the filter values to determine whether that portion of data matches the filter values; and outputting, based on the comparing, a result of the execution of the query. The result includes data stored in the identified row upon determination that the stored data matches the unique key value corresponding to the first filter predicate and the filter values corresponding to the remaining filter predicates.

In some implementations, the current subject matter can include one or more of the following optional features. In some implementations, identifying of at most one row may include searching, using the unique key value, the one or more tables to identify the at most one row, and terminating the searching upon identifying the at most one row.

In some implementations, the filter predicates may be evaluated using at least one of a data vector lookup and a dictionary lookup. In some implementations, one or more filter predicates may be evaluated using a column lookup.

In some implementations, the result may be an empty result upon determination that no rows in the one or more tables include data matching at least one of the first filter predicate and the one or more filter values corresponding to the remaining filter predicates.

In some implementations, the query may be executed by a database execution engine and the query is received from an application separate from the database execution engine. The query may be executed in accordance with a query plan optimized by the database execution engine.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide an ability to perform query execution planning, including performing unique key lookup and using additional filters.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

Figure 1A:
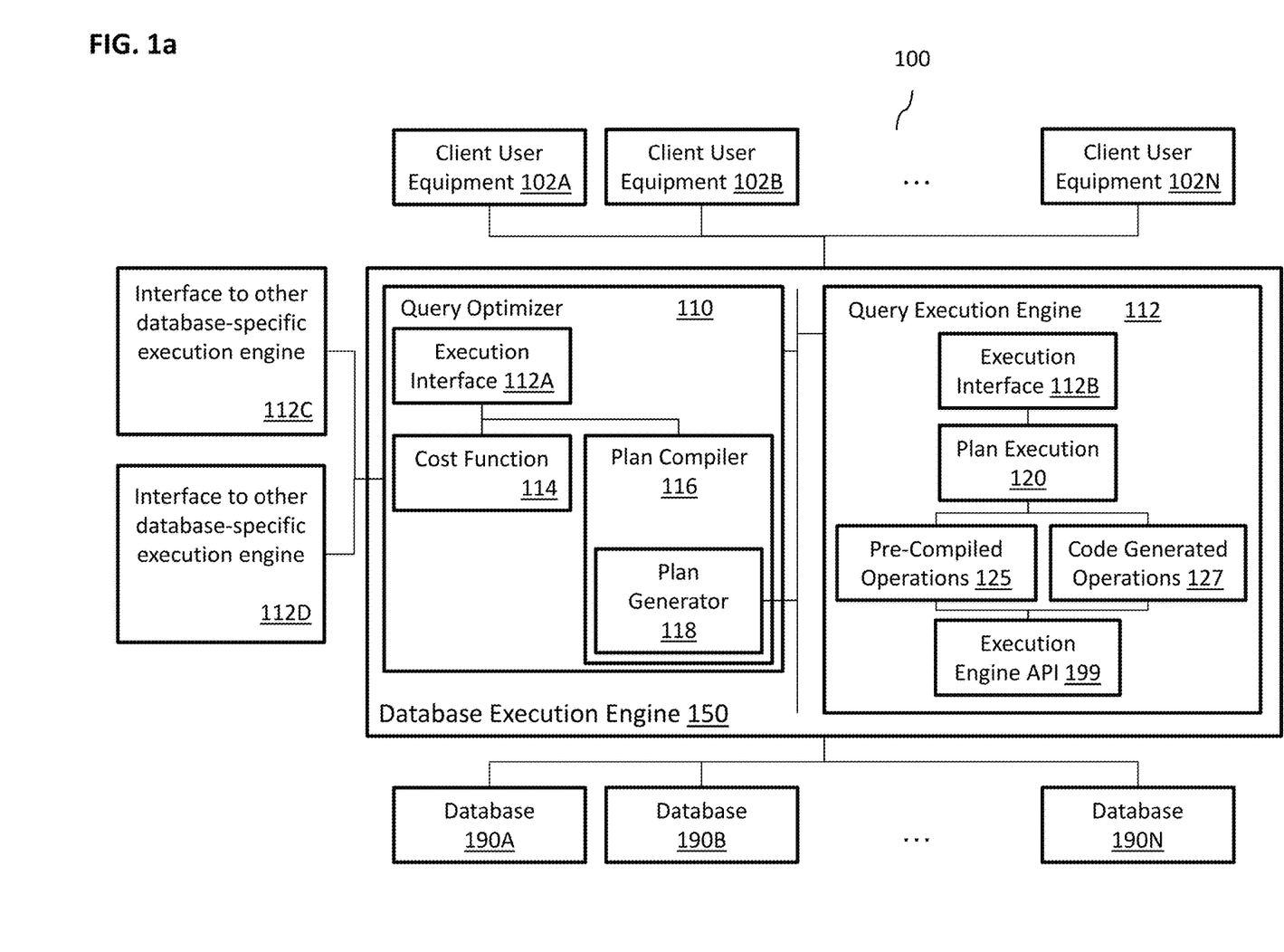
FIG. 1a illustrates an exemplary block diagram for a system, according to some implementations of the current subject matter.

FIG. 1a illustrates an exemplary system 100, in accordance with some example implementations. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1a, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID (or "valueID" or "valueid", which hereinafter will be used interchangeably) of "1" and an indexvector scan (also referred to as data vector scan, which will be used interchangeably herein) with a valueid obtained from the dictionary look up, which results in a document ID (or "documentID" or "documentid" or "docid", which hereinafter will be used interchangeably) list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls Made On Database API |
|---|---|
| 1) TableScan (Filter X = 1) | dictionary lookup column "X" for the "value of ID of 1" |

TABLE 1-continued

| Operator | Calls Made On Database API |
|---|---|
| | indexvector scan with a valueid from the lookup, which results in a document ID (docid) list that identifies one or more rows in table "1" |
| 2) Materialization (Columns A, B) | for each docid, lookup value IDs (valueids) for columns A + B for the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

In some implementations, queries use predicates to select and/or filter data in a table using various values that may be assigned to the predicates. A predicate may define a logical condition that may be applied to rows in a table. A predicate may be included in clauses, functions, and expressions in query statements (e.g., SQL queries). It returns true, false, or unknown. In some implementations, a predicate may be used in a search condition of a WHERE clause, a HAVING clause, a SELECT clause, a join condition of FROM clauses, and/or any other constructs where a Boolean value may be used.

Figure 1B:
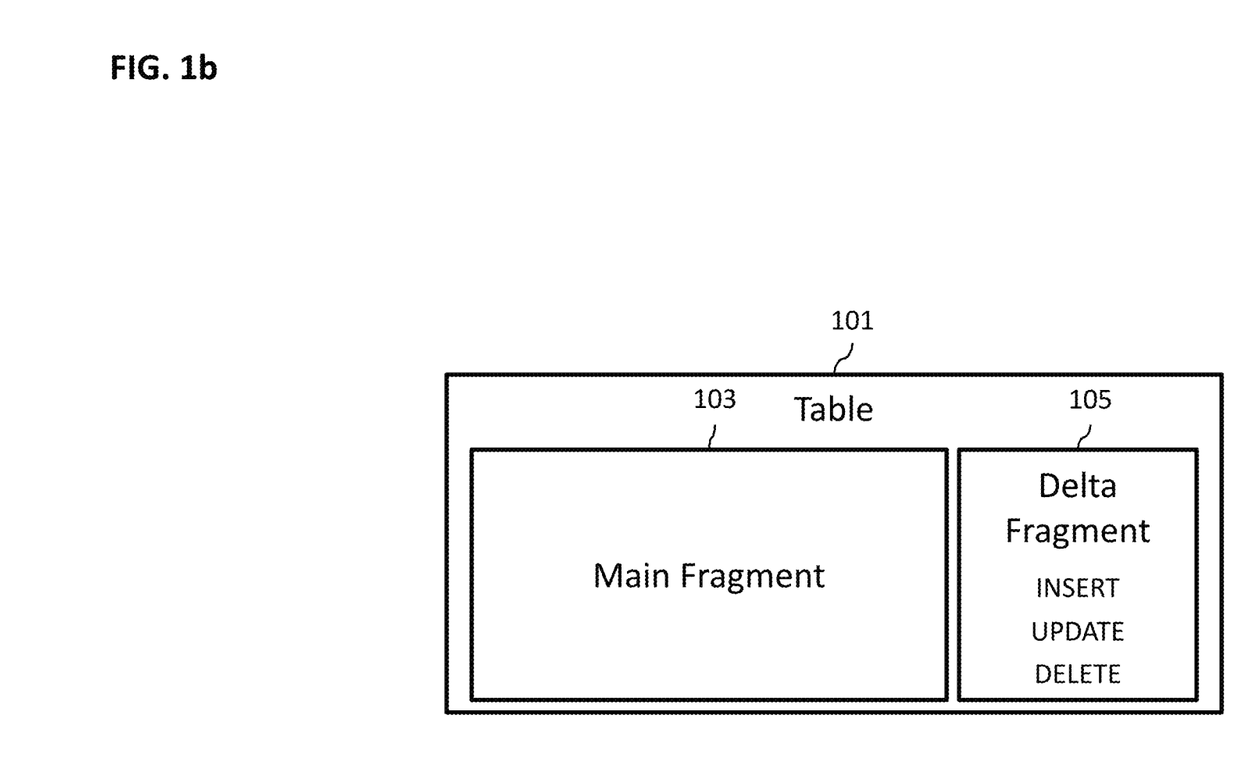
FIG. 1b illustrates an exemplary table in a column store.

As shown in FIG. 1b, tables (e.g., table 101) in a column store database system may be separated into two separate containers or partitions—a main fragment/partition 103 and a delta fragment/partition 105. The terms fragment and partition may be used interchangeably herein.

The main fragment 103 may include data that is not subject to change or data that has not been changed recently. This fragment may be optimized for read-access, e.g., using dictionary compression with sorted dictionaries. All updates to a table may be implemented as changes to the delta fragment 105. These may include INSERT, UPDATE, DELETE, etc. changes to the data. Dictionary compression may also be applicable to the delta fragment 105. The contents of the delta and main fragments 103, 105 may be combined using a merge operation. This operation may provide the only way to write to the main fragment 103. The merge operation may be performed (e.g., automatically, manually, etc. by the database system) to make sure that the delta fragment 105 does not contain more than a predetermined amount of table data (e.g., no more than 10%).

The table 101 may be split into even further partitions or fragments using one or more pre-defined partition criteria. In this case, multiple main fragments and multiple delta fragments may exist, where each column of the table may exist in each fragment. This may make table scans (TableScan) more complicated and burdensome on the system. A TableScan may involve searches (e.g., predicate evaluations) on one or multiple columns across one or multiple partitions. A TableScan may include one or multiple fragment scans (FragmentScans), where each FragmentScan may include of one or multiple column scans (ColumnScans). A ColumnScan may involve evaluation of a predicate on a column. For example, in the following query statement

SELECT*FROM T WHERE A>1 AND B<=2 OR C<>3

The system 100 (shown in FIG. 1a) may have to evaluate predicates A>1 on column A, B<=2 on column B, and C<>3 on column C in all fragments/partitions of table T. As such, the system 100 may perform a TableScan that may include a FragmentScan for each fragment and each FragmentScan may include three ColumnScan(s), each one on column A, B and C. As such, for the whole table search, the system 100 may have to scan each fragment to find all matching rows responsive to the above query statement.

As indicated above, queries use predicates to select and/or filter data in a table using various values that may be assigned to the predicates. A predicate may define a logical condition that may be applied to rows in a table. A predicate may be included in clauses, functions, and expressions in query statements (e.g., SQL queries). It returns true, false, or unknown. In some implementations, a predicate may be used in a search condition of a WHERE clause, a HAVING clause, a SELECT clause, a join condition of FROM clauses, and/or any other constructs where a Boolean value may be used.

Column store tables may also be compressed. Typically, a compression operation on such column store table may create a compression dictionary, assuming one does not exist, and it may compress rows of the table without moving them. During compression operation, the data may be sorted out and a ValueID may be mapped against each unique value in the column. The system may save this information in a dictionary, where actual entries may include only ValueID of the corresponding entry. Further, in each fragment of the table, the same column may have different compression and an index (which may be implicitly created) may exist on one fragment, but not on another fragment of the table. This means that the filter evaluation process may need to be different for each fragment.

In some implementations, the current subject matter system may be configured to allow searching of whole columns of tables stored in the database system, e.g., system 100. The whole column may be searched using a table scan ("TableScan") search, an index scan ("IndexScan") search and a unique key lookup ("UniqueKeyLookup") search. A table scan may require a database engine to read the data in the table directly. It is typically a full table scan (i.e., each filter predicate in the query as well as a visibility of rows over all fragments may need to be evaluated), which may involve a significant amount of compute resources and may take some time.

During an index scan search, the database system may read the data in the index directly and when it finds the data in the index that is being sought, the system may use addresses of the records in the index in the table and read only what is required. Because an index is ordered, an index scan may read less data and hence, involve less compute resources than the table scan, even though the actual data is still obtained from the table after completion of the search (assume other data, besides the index, is being sought).

A unique key lookup search may be used a filter predicate may have a unique value assigned to it (e.g., with operator EQ (=) on a column that is unique). A key may be used for the purposes of identification, access and update of information in a database table. A table may have one or more such keys. For example, a table of employees may have separate keys for employee number and department name. A key constraint or a uniqueness constraint in a table may provide data integrity feature of the database. In some cases, updates that cause duplicate key values may be prevented by the databases so as to ensure that tables comply with specific uniqueness rules.

A unique key (also referred to as a candidate key) of a relation may be a minimal superkey for that relation. As such, a unique key may be characterized by attributes that the relation does not have two distinct tuples (e.g., rows or records) with the same values for these attributes (i.e., the set of attributes is a superkey), and there is no proper subset of these attributes for which the relation holds (which means that the set is minimal). A table may have one or more such unique keys. When a column or set of columns is defined as unique, the database system may verify that each set of values is unique before assigning a constraint. Once columns are deemed unique and an insertion with existing values that is attempted, an error will be generated.

An exemplary unique key lookup search may be performed using a filter predicate with operator EQ (=) on a column that is unique. For example, the following statement may be used:

SELECT*FROM T WHERE A=1, assuming A is the primary key of table A.

In some implementations, the current subject matter database system 100 may sequentially search (or lookup, evaluate, etc.) the table's fragments and as soon as it finds a matching row, the searching may be terminated and query results may be generated. This is because there can be at most one matching row. This may save significant amounts of compute resources and time as there is no need to scan all fragments of table(s).

In some exemplary, non-limiting implementations, a unique key lookup search in response to queries may be performed using additional filter predicates. For example, the above query statement may be modified as follows:

SELECT*FROM T WHERE A=1 AND <additional filter>

As such, once a matching row from the unique key lookup scan on parameter A=1 is found, then a DataVectorLookup and DictionaryLookup processes for each predicate that may be included in the additional filter may be executed. These processes may verify that the identified/found row also matches the information sought for by the additional filter. Because at most one table row may result from the unique key look search/scan, no specific additional filter evaluation strategy may be required, which may save further compute resources and/or time.

In some implementations, DataVectorLookup and DictionaryLookup processes may be executed as a two-step operation, where execution of one or both may be dependent on a particular table type. For example, in a column store system, distinct values of a column may be saved in a dictionary and an index for those values may be generated in a data vector (or an indexvector, as referred to above). Columns of other table types may include a separation into other data structures. Hence, one implementation of the above processes may include generating a list including cell values, where the index of that list may represent a row of the table. Hence, only one operation may be necessary—a ColumnLookup (instead of a two-step operation of the DataVectorLookup and DictionaryLookup). In a ColumnLookup operation (which is different from a ColumnScan, where all rows are scanned to find rows that match a particular predicate), lookup of one or more rows (but typically not all rows) may be performed to verify whether it matches a particular predicate. If the column includes multiple structures (e.g., as in a column store), the scanning and lookup operations may be performed separately for each structure (e.g., DictionaryLookup, DictionaryScan, DataVectorLookup and/or DataVectorScan may be used). As a result, one row would be determined based on a UniqueKeyLookup, then value in a column would be retrieved by performing a lookup in the list (i.e., ColumnLookup) and evaluation of an additional filter predicate would be performed to determine whether it matches that value. Further, in some implementations, to evaluate other table types, including temporary tables, which are not persisted and which do not have separate structures, the ColumnLookup may also be performed.

In some implementations, independently of any underlying structures and/or implementation, the current subject matter may perform verification that an additional filter in the query matches on at most one specific row. In particular, the current subject matter may perform a lookup of the value of that row and evaluate if the additional filter matches that value. If the additional filter includes multiple predicates, the value lookup and filter evaluation may be performed for each such predicate. In some exemplary implementations, the current subject matter system may terminate evaluation of predicates if it find that one or more parts of the filter are not true for the specific row. For example, referring to FIG. 3, in a query WHERE ID=42 AND NAME=OLIVER AND CITY=WALLDORF, row number 3 may be identified as a result of UniqueKeyLookup on ID=42 and evaluation of NAME=OLIVER may be performed. However, if the table does not match this predicate (i.e., it is not true), then evaluation of the second predicate—CITY=WALLDORF does not have to be performed and any further evaluation of this statement may be terminated resulting in an empty result.

Figure 2:
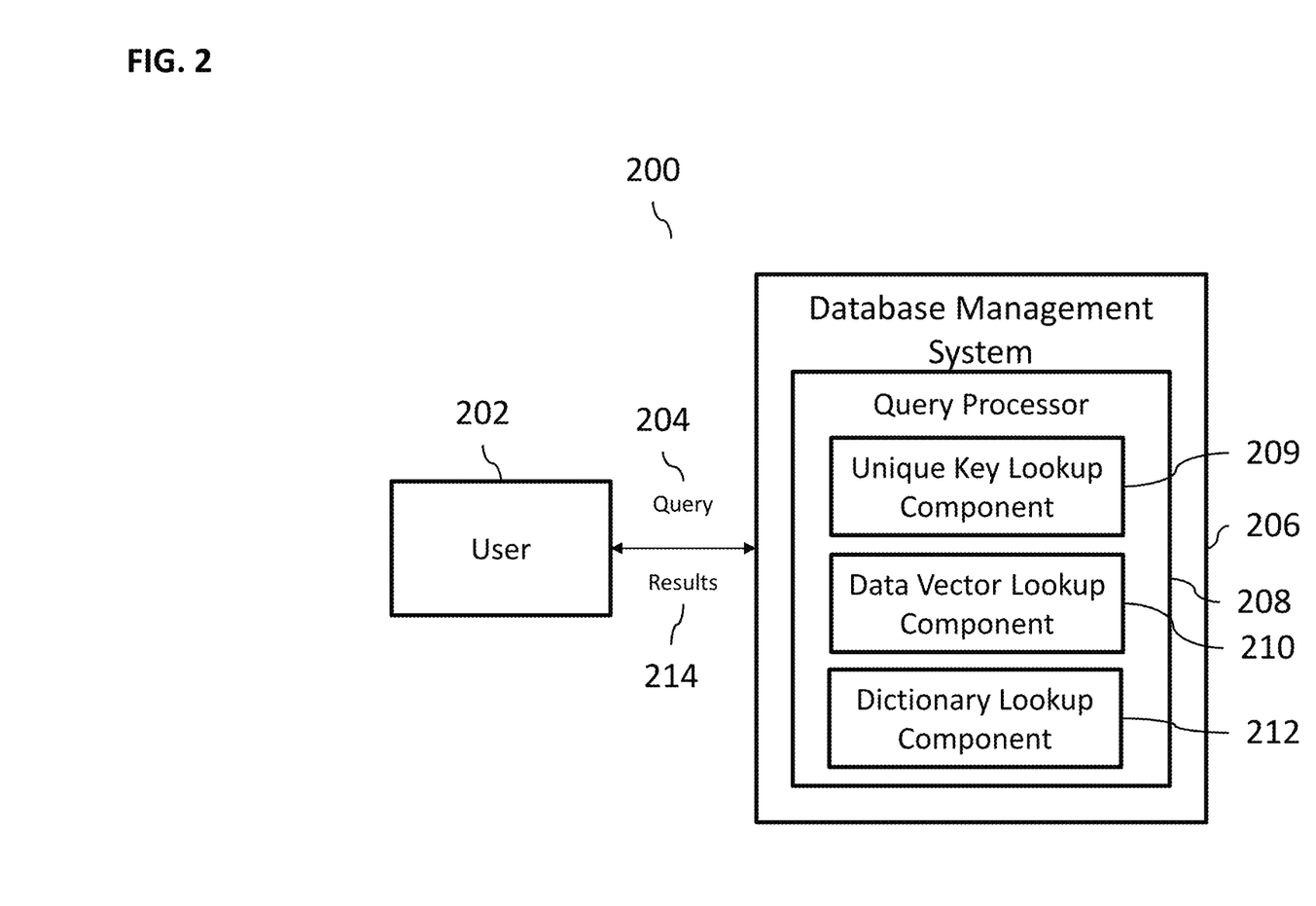
FIG. 2 illustrates an exemplary system for execution of a query, according to some implementations of the current subject matter.

FIG. 2 illustrates an exemplary system 200 for execution of a query, according to some implementations of the current subject matter. The system 200 may be incorporated into the system 100 shown in FIG. 1a. The system 200 may include a database management system 206 that may include a query processor 208 that may perform execution of queries 204 submitted by a user 202. The query processor 208 may include a unique key lookup component 209, a data vector lookup component 210 and a dictionary lookup component 212.

Components and/or users of the system 200 may be any type of hardware, software, and/or any combination of both. A component of the system 200 may further include entire computing systems that may have its own libraries, user interface elements, deployment parameters and/or systems, lifecycles, operation and support processes, etc. Each of the user 202, system 204, processor 208, etc. databases may be any type of computing systems, computing components, software, hardware, cloud computing systems, etc., and/or any combination thereof. For example, the system 200 may be implemented in various in-memory database systems, such as a High Performance Analytic Appliance ("HANA") system as developed by SAP SE, Walldorf, Germany.

In some implementations, the components of the system 200 may be communicatively coupled using any type of communication connection, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

In some implementations, the system 200 may be configured to analyze a query plan and perform a search using the unique key lookup component 209 to determine whether at most one row exists that matches a particular predicate contained in the query statement. Once that row is identified, components 210 and 212 may be engaged to determine whether data contained in the identified row matches any additional filter contained in the query statement.

Figure 3:
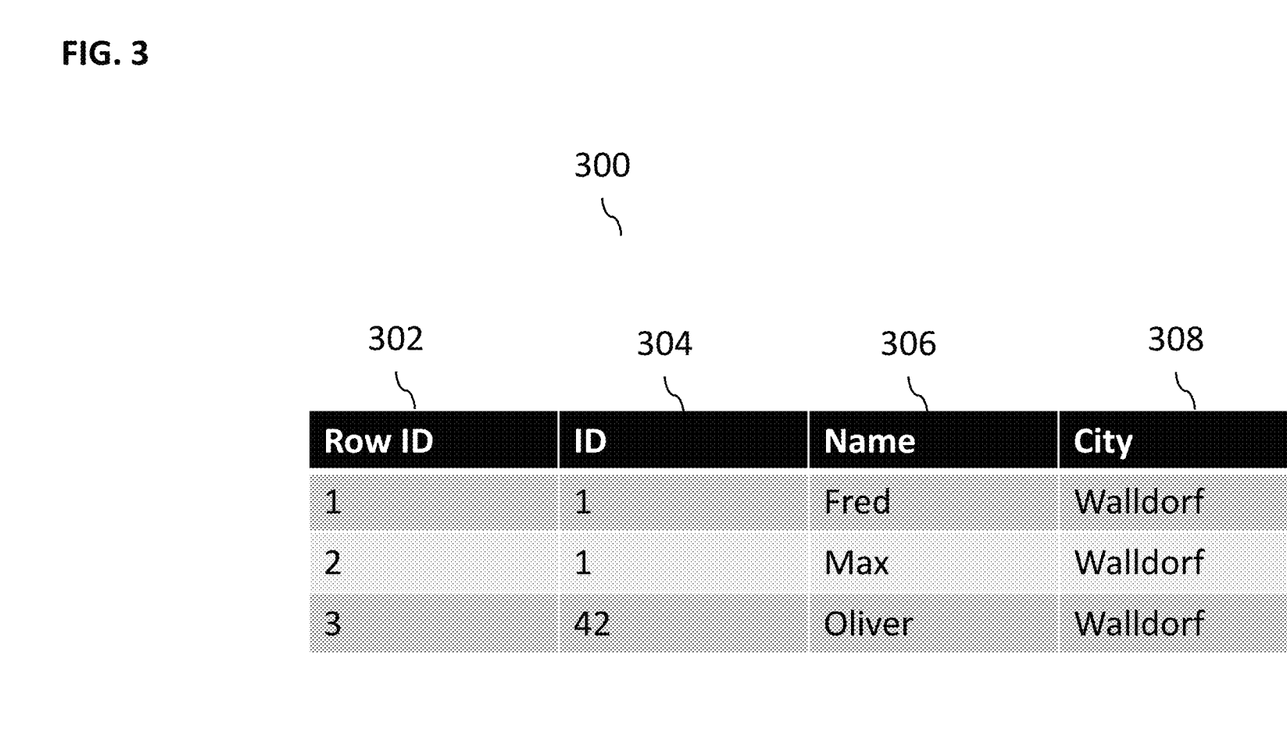
FIG. 3 illustrates an exemplary table that may be sequentially scanned by the system shown in FIG. 2 using a unique key lookup as well as data vector lookup and/or dictionary lookup.

FIG. 3 illustrates an exemplary table 300 that may be sequentially scanned by the system 200 using a unique key lookup as well as data vector lookup and/or dictionary lookup in response to the following query statement:

SELECT*FROM T WHERE ID=42 AND NAME=OLIVER AND CITY=WALLDORF

The above statement indicates that the table should be scanned for a row that matches predicate value of ID=42. Once that row is found, data contained in that row must be checked against additional filter predicates of NAME=OLIVER and CITY=WALLDORF. If a match is found on the predicate and additional filter, then the system may determine that the row matches what the query is seeking and results may be outputted. As stated above, if the evaluation of the first predicate does not return a true value, evaluation of the second predicate might not be performed generating in an empty result.

As shown in FIG. 3, the table 300 may have four columns: a RowID column 302, an ID column 304, a NAME column 306, and a CITY column 308. RowID=3 contains information matching the predicate ID=42. No further scanning of rows is necessary, as there can be at most one row that matches this predicate. The data vector lookup component 210 and dictionary lookup component 212 may then be engaged to determine whether information in that row matches additional filter predicates of NAME=OLIVER and CITY=WALLDORF. As shown in FIG. 3, there is a match with the additional filter predicates, and hence, no further searching/scanning of the table is necessary.

Figure 4:
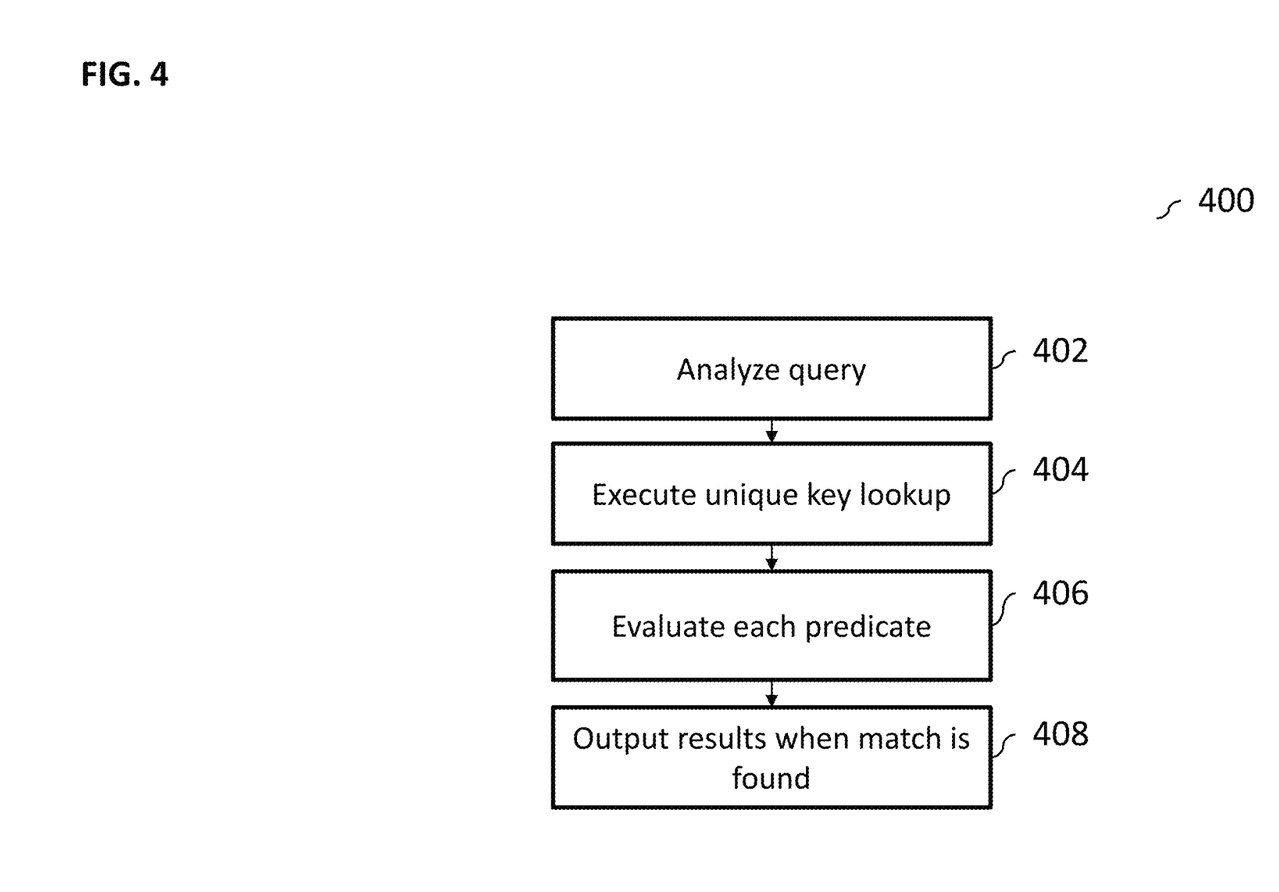
FIG. 4 illustrates an exemplary process for executing queries that may be performed by the system shown in FIG. 2, according to some implementations of the current subject matter.

FIG. 4 illustrates an exemplary process 400 for executing queries that may be performed by the system 200 shown in FIG. 2, according to some implementations of the current subject matter. At 402, a query and its predicates may be analyzed. At 404, the unique key lookup component 209 may be executed to perform a search of the table for the presence of data responsive to the unique key contained in the query statement (e.g., ID=42 in the above query example). Once a row containing such unique key is found, the searching of the table may be terminated. At 406, the current subject matter system may perform evaluation of each predicate contained in the query and determine whether the identified row contains information that matches the additional filter predicates contained in the query statement (e.g., NAME=OLIVER and CITY=WALLDORF). If there is a match, data contained in the row may be outputted as results responsive to the query statement, at 408.

Figure 5:
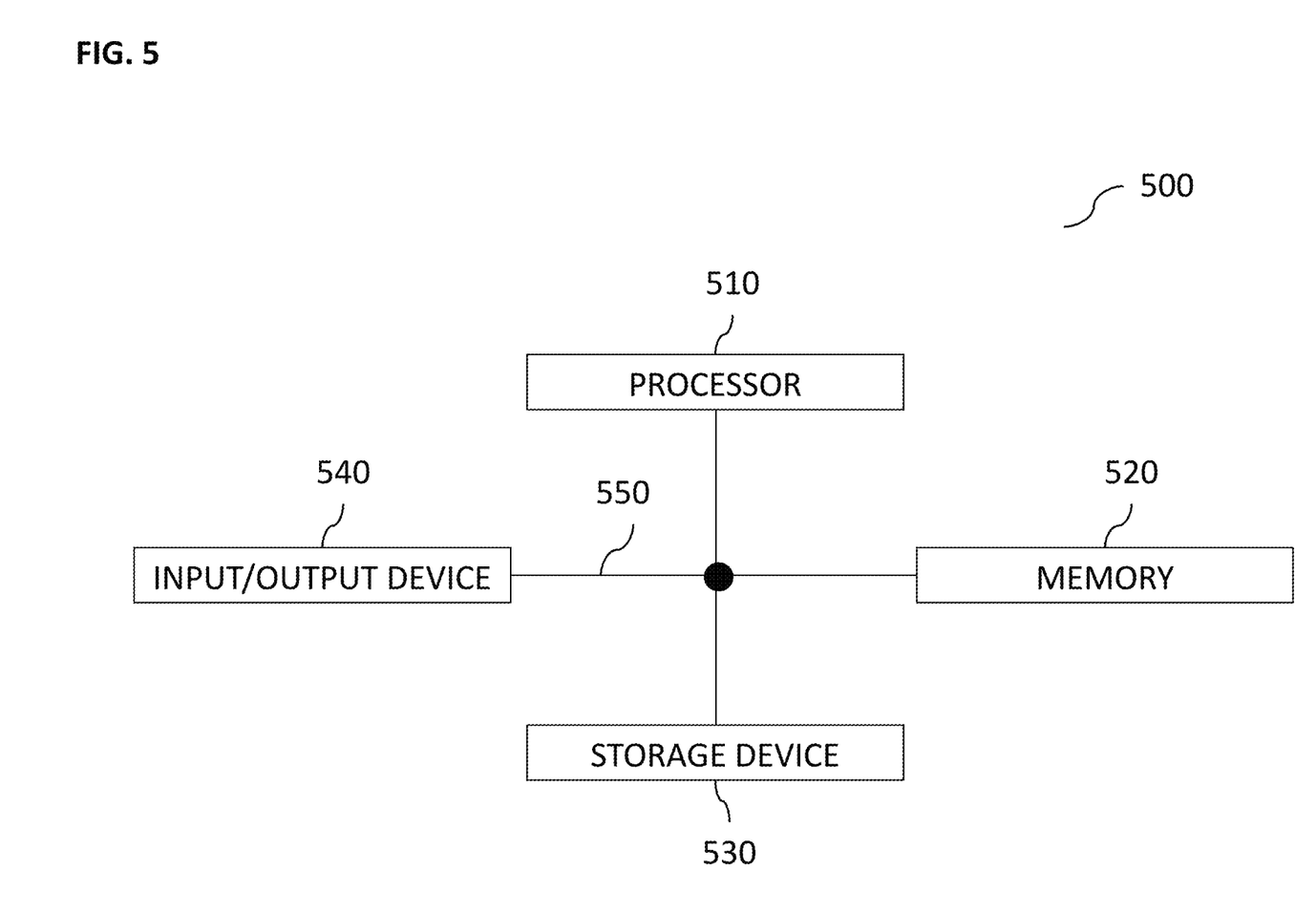
FIG. 5 is an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
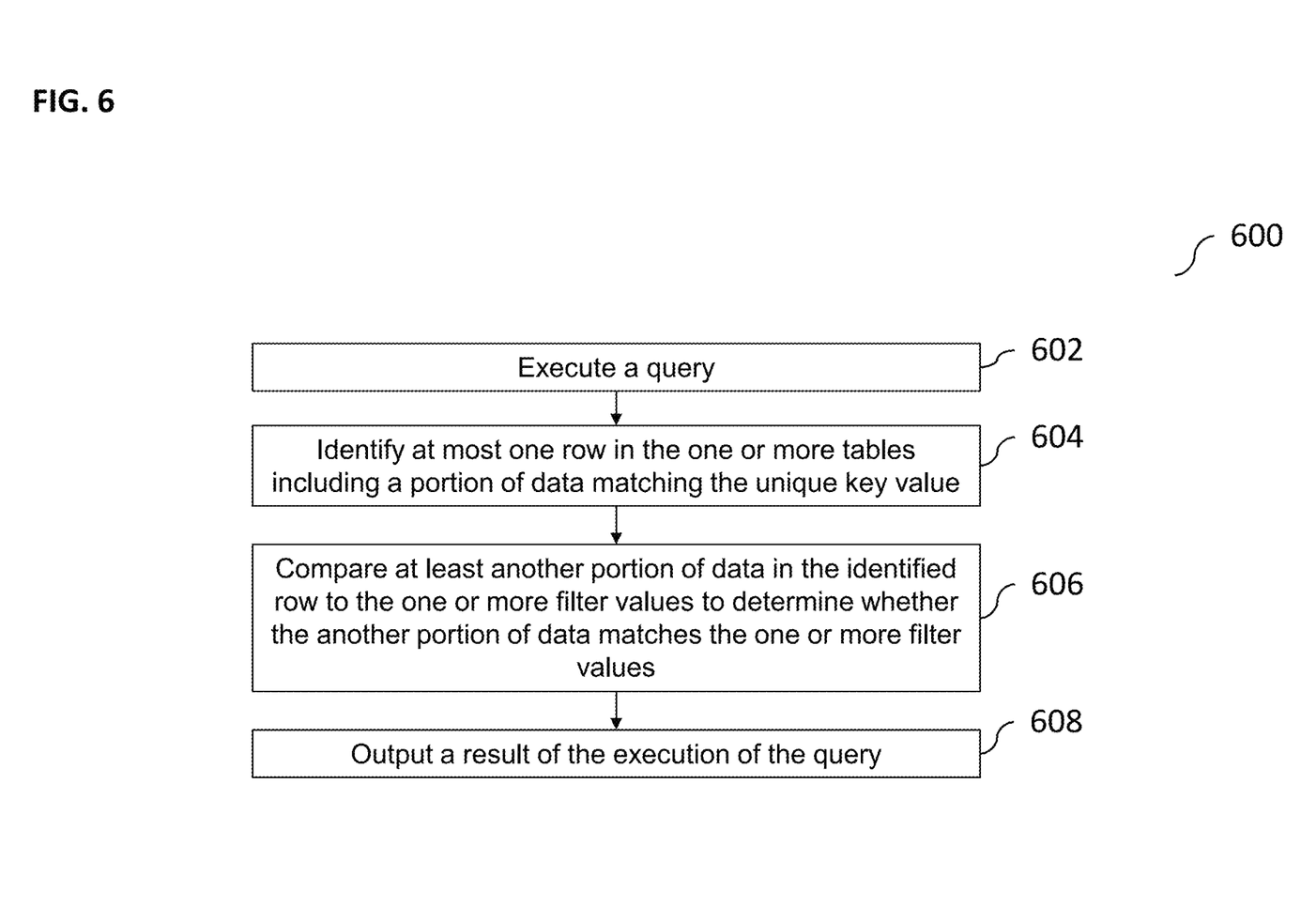
FIG. 6 is an exemplary method, according to some implementations of the current subject matter.

FIG. 6 illustrates an exemplary method 600 for executing a query in a database system, according to some implementations of the current subject matter. At 602, a query may be executed. The query may require access to one or more tables stored in a database system (e.g., system 100 shown in FIG. 1a). The query may include one or more filter predicates (e.g., ID=42, NAME=OLIVER and CITY=WALLDORF). At 604, using a unique key value corresponding to a first filter predicate (e.g., ID=42 (using a unique key value component 209 shown in FIG. 2)), at most one row in the table (e.g., RowID=3) including a portion of data (e.g., ID=42) matching the unique key value may be identified. At 606, using one or more filter values in the filter predicates, at least another portion of data in the identified row may be compared to the filter values to determine whether that portion of data matches the filter values. At 608, based on the comparing, a result of the execution of the query may be outputted. The result may include the data stored in the identified row upon determination that the stored data matches the unique key value corresponding to the first filter predicate and the filter values corresponding to the remaining filter predicates.

In some implementations, the current subject matter can include one or more of the following optional features. In some implementations, identifying of at most one row may include searching, using the unique key value, the one or more tables to identify the at most one row, and terminating the searching upon identifying the at most one row.

In some implementations, the filter predicates may be evaluated using at least one of a data vector lookup and a dictionary lookup. In some implementations, one or more filter predicates may be evaluated using a column lookup.

In some implementations, the result may be an empty result upon determination that no rows in the one or more tables include data matching at least one of the first filter predicate and the one or more filter values corresponding to the remaining filter predicates.

In some implementations, the query may be executed by a database execution engine and the query is received from an application separate from the database execution engine. The query may be executed in accordance with a query plan optimized by the database execution engine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   executing a query, the query requiring access to one or more tables stored in a database system, the query including one or more filter predicates;
   identifying, using a unique key value corresponding to a first filter predicate in the one or more filter predicates, at most one row in the one or more tables including a portion of data matching the unique key value;
   comparing, using one or more filter values corresponding to the one or more filter predicates, at least another portion of data in the identified row to the one or more filter values to determine whether the another portion of data matches the one or more filter values, wherein evaluation of the one or more filter predicates includes:
      generating a list of cell values in the one or more tables; and
      executing, in accordance with a type of a table in the one or more tables, a column lookup of the generated list of cell values to determine whether the another portion of data matches the one or more filter values, wherein, based on the executing, the one or more filter predicates are evaluated using at least one of a data vector lookup and a dictionary lookup to determine whether the identified row matches one or more remaining filter predicates in the one or more filter predicates; and
   outputting, based on the comparing, a result of the execution of the query,
   wherein the result includes the data stored in the identified row upon determination that the stored data matches the unique key value corresponding to the first filter predicate and the one or more filter values corresponding to the remaining filter predicates in the one or more filter predicates.

2. The method according to claim 1, wherein identifying further comprises:
   searching, using the unique key value, the one or more tables to identify the at most one row; and
   terminating the searching upon identifying the at most one row.

3. The method according to claim 1, wherein the result is an empty result upon determination that no rows in the one or more tables include data matching at least one of the first filter predicate and the one or more filter values corresponding to the remaining filter predicates.

4. The method according to claim 1, wherein the query is executed by a database execution engine and the query is received from an application separate from the database execution engine.

5. The method according to claim 4, wherein the query is executed in accordance with a query plan optimized by the database execution engine.

6. A system comprising:
   at least one programmable processor; and
   a non-transitory machine-readable medium storing instructions that, when executed by the at least one programmable processor, cause the at least one programmable processor to perform operations comprising:

executing a query, the query requiring access to one or more tables stored in a database system, the query including one or more filter predicates;

identifying, using a unique key value corresponding to a first filter predicate in the one or more filter predicates, at most one row in the one or more tables including a portion of data matching the unique key value;

comparing, using one or more filter values corresponding to the one or more filter predicates, at least another portion of data in the identified row to the one or more filter values to determine whether the another portion of data matches the one or more filter values, wherein evaluation of the one or more filter predicates includes:

generating a list of cell values in the one or more tables; and executing, in accordance with a type of a table in the one or more tables, a column lookup of the generated list of cell values to determine whether the another portion of data matches the one or more filter values, wherein, based on the executing, the one or more filter predicates are evaluated using at least one of a data vector lookup and a dictionary lookup to determine whether the identified row matches one or more remaining filter predicates in the one or more filter predicates; and outputting, based on the comparing, a result of the execution of the query, wherein the result includes the data stored in the identified row upon determination that the stored data matches the unique key value corresponding to the first filter predicate and the one or more filter values corresponding to the remaining filter predicates in the one or more filter predicates.

7. The system according to claim 6, wherein identifying further comprises:

searching, using the unique key value, the one or more tables to identify the at most one row; and terminating the searching upon identifying the at most one row.

8. The system according to claim 6, wherein the result is an empty result upon determination that no rows in the one or more tables include data matching at least one of the first filter predicate and the one or more filter values corresponding to the remaining filter predicates.

9. The system according to claim 6, wherein the query is executed by a database execution engine and the query is received from an application separate from the database execution engine.

10. The system according to claim 9, wherein the query is executed in accordance with a query plan optimized by the database execution engine.

11. A computer program product comprising a non-transitory machine-readable medium storing instructions that, when executed by at least one programmable processor, cause the at least one programmable processor to perform operations comprising:

executing a query, the query requiring access to one or more tables stored in a database system, the query including one or more filter predicates;

identifying, using a unique key value corresponding to a first filter predicate in the one or more predicates, at most one row in the one or more tables including a portion of data matching the unique key value;

comparing, using one or more filter values corresponding to the one or more filter predicates, at least another portion of data in the identified row to the one or more filter values to determine whether the another portion of data matches the one or more filter values, wherein evaluation of the one or more filter predicates includes:

generating a list of cell values in the one or more tables; and executing, in accordance with a type of a table in the one or more tables, a column lookup of the generated list of cell values to determine whether the another portion of data matches the one or more filter values, wherein, based on the executing, the one or more filter predicates are evaluated using at least one of a data vector lookup and a dictionary lookup to determine whether the identified row matches one or more remaining filter predicates in the one or more filter predicates; and outputting, based on the comparing, a result of the execution of the query, wherein the result includes the data stored in the identified row upon determination that the stored data matches the unique key value corresponding to the first filter predicate and the one or more filter values corresponding to the remaining filter predicates in the one or more filter predicates.

12. The computer program product according to claim 11, wherein identifying further comprises:

searching, using the unique key value, the one or more tables to identify the at most one row; and terminating the searching upon identifying the at most one row.

13. The computer program product according to claim 11, the result is an empty result upon determination that no rows in the one or more tables include data matching at least one of the first filter predicate and the one or more filter values corresponding to the remaining filter predicates.

14. The computer program product according to claim 11, wherein the query is executed by a database execution engine and the query is received from an application separate from the database execution engine, wherein the query is executed in accordance with a query plan optimized by the database execution engine.

* * * * *